Nov. 10, 1931.  G. S. NEELEY  1,831,075
MEANS OF REMOVING SCALE MATTER FROM LIQUIDS
Filed Oct. 20, 1926  2 Sheets-Sheet 1
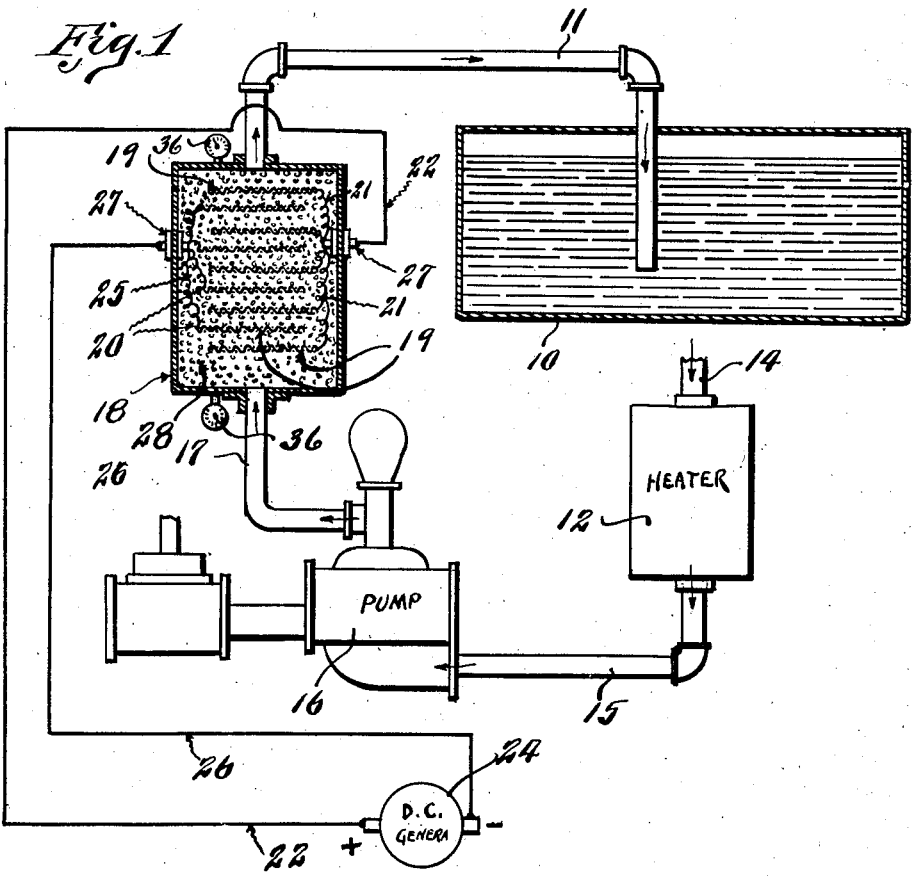
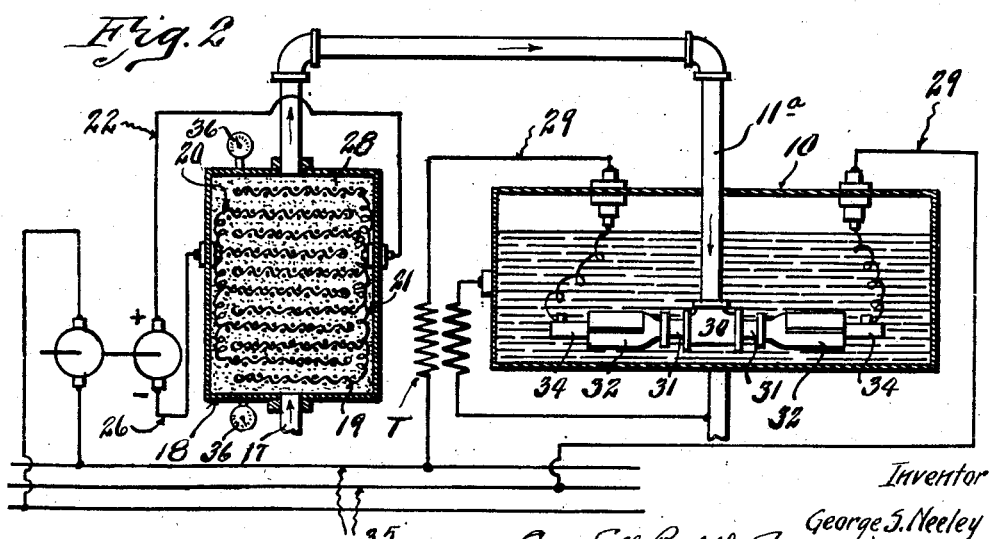
Inventor
George S. Neeley

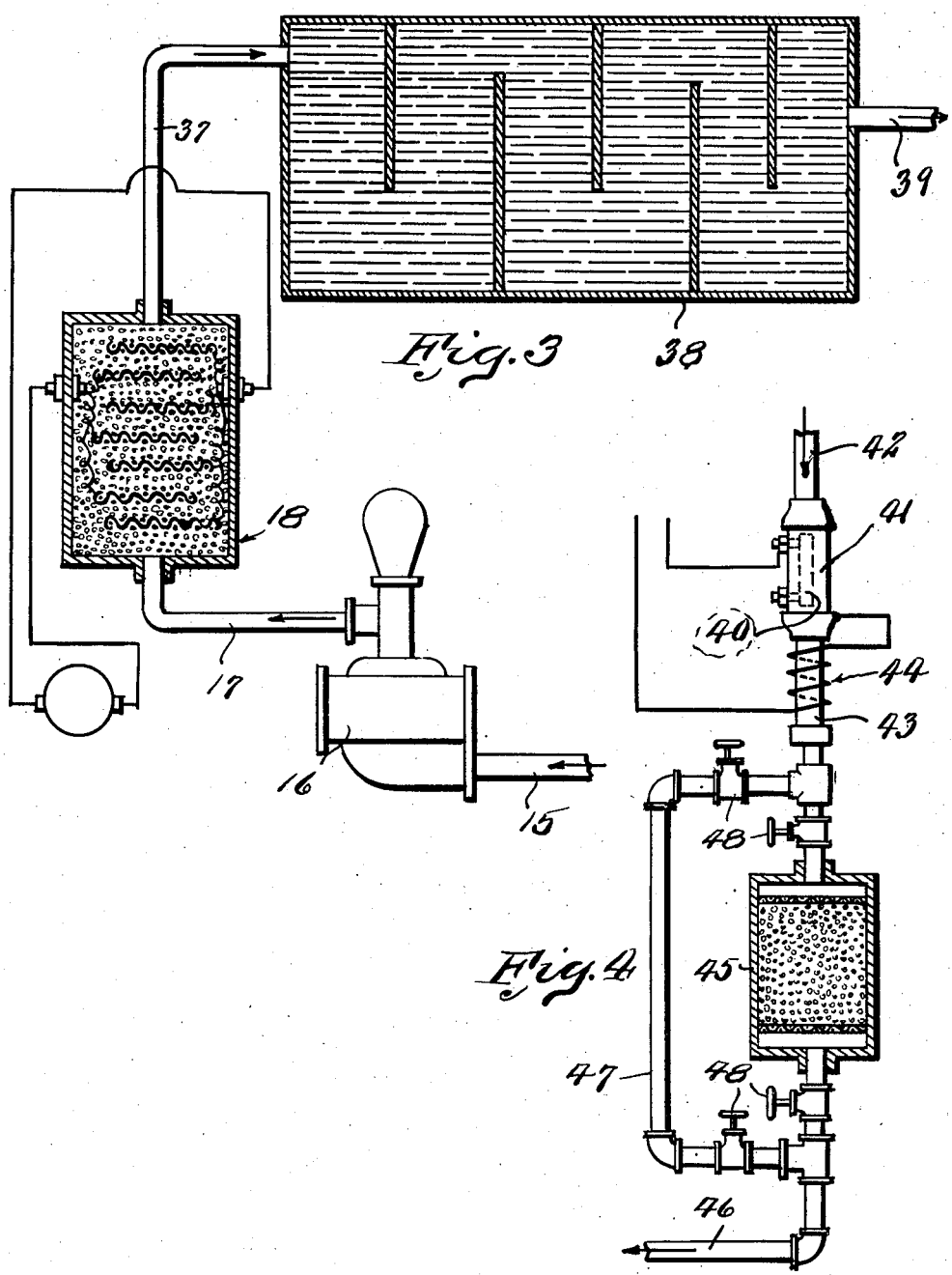

Patented Nov. 10, 1931

1,831,075

UNITED STATES PATENT OFFICE

GEORGE S. NEELEY, OF HARTFORD, ILLINOIS, ASSIGNOR OF ONE-HALF TO GRIFFIN WATKINS, OF ALTON, ILLINOIS

MEANS OF REMOVING SCALE MATTER FROM LIQUIDS

Application filed October 20, 1926. Serial No. 142,959.

This invention relates to a novel method and means of removing scale matter from liquids and has for its objects the provision of an apparatus for treating the liquid exteriorly of the container into which said liquid is being discharged.

In United States Letters Patent No. 1,579,454, granted to me April 6, 1926, I disclose the fact that scale or "fur" deposits are formed or built up by the electro-plating action of the electric current which is unidirectional and is generated by the great differences of temperature that are naturally produced in the operation of steam boilers.

The objects of my present invention are to take advantage of this fact of the formation of scale by the use of a counter-electroplating process set up in a closed vessel exterior to the boiler or container so as to induce the scale matter to be deposited or electroplated on suitable metallic screens arranged in said vessel, thereby preventing said scale matter from entering the boiler or other container. By this method I am enabled to apply a much more powerful direct current to the entire feed water supply at a point located away from the boiler, thereby reaching the whole of the chemical constituents of the feed water supply so as to successfully arrest the formation of scale in the boiler by a process of electro-plating set up in a separate container or vessel through which the water is compelled to pass before being admitted to the boiler. Thus the scale matter is removed electrolytically from the feed water supply and deposited on metallic screens which are removable, thereby leaving the feed water free of all chemical matter which is subject to electrolytic influence. The screens may be removed for cleaning purposes so as to remove the scale deposits therefrom or they may be replaced by new screens.

Another object of my novel method is to remove or separate all the chemical contents of the feed water supply which are influenced by electro-chemical action and to effect such separation without the necessity of shutting down the boiler unit for washing or cleaning, thereby obviating the loss of time incidental to such shutting down of the boiler.

In practice, I prefer to use one or a plurality of electrically charged or excited metallic screens, the number of screens used depending upon the operating circumstances as to whether or not one or more screens are necessary to successfully collect the entire amount of scale matter from the feed water supply of the boiler. Such a method is advantageous to the user in that the cost of the apparatus is proportional to the amount of scale to be removed from the particular feed water supply as is found in his individual case. Such an arrangement is particularly desirable due to the fact that great variations in the chemical constituents of the various feed water supplies exist through the different States and countries. The metallic screens or collectors are supported in any suitable manner inside of a closed vessel through which the feed water is conveyed, and said screens are insulated therefrom. These screens are preferably arranged in spaced superimposed relation so that they may be readily removed for cleaning. As a further means of removing solid matter from the feed water supply, especially such matter as is not effected by electrolytic action, sand and gravel or other filtering medium is arranged in said closed vessel and interposed between the screens or collectors. Sand and gravel is preferable on account of the fact that this material is also a good non-conductor of electricity as well as an excellent filtering medium. Thus a positive means is provided for filtering out all solids from the feed water supply, rendering the latter free from the scale matter by electrolytic treatment and free of all solid matter by filtration, both the electro-plating and the filtration being done by the same apparatus before the feed water supply is admitted into the boiler.

Further objects of my invention are to provide means for electrolytically treating the feed water supply by means of a direct electric current independently of the boiler and without effecting or interfering with the electrical protective circuits of the latter.

Still further objects of the invention are to provide an apparatus for treating the feed water supply electrolytically exteriorly of the boiler and simultaneously with the rise in temperature and pressure of said feed water supply.

Additional objects of my invention are to provide a method of purifying water by subjecting it to electrolytic treatment to produce coagulation of solids contained in said water and to separate such matter by filtration or settling.

With these and other objects in view, my invention consists in certain novel features of construction and arrangement of parts, hereinafter more fully described and claimed, and illustrated in the accompanying drawings, in which—

Figure 1 is a diagrammatic view of a boiler and its feed water supply and showing my improved apparatus applied thereto.

Figure 2 is a similar view and showing the boiler equipped with electrical connections for protecting the latter against electrical corrosion, and pitting.

Figure 3 is a diagrammatic view of a modified method wherein the liquid is subjected to electrolytic treatment to produce coagulation of the impurities contained therein and then separating the coagulated matter from the liquid by settling.

Figure 4 shows still another modified form of my invention.

Referring by numerals to the accompanying drawings which illustrate diagrammatically my improved method, 10 indicates a water container, in the present instance, a boiler, having a feed water pipe 11 leading thereinto. The feed water is generally heated before being admitted into the boiler and in the drawings a heater 12 is shown interposed in the pipe connection 11 and having an inlet pipe connection 14. An outlet pipe connection 15 leads from said heater to a pump 16. The latter is used to force the feed water under a definite pressure into the boiler.

A pipe connection 17 leads from the pump into one end of the closed vessel 18, the opposite end being connected to pipe 11. Vessel 18 is provided with a series of metallic screens 19 and 20 which are horizontally disposed therein in superimposed relation with each other and adapted to be traversed by the water passing through said vessel. Screens 19 are connected together by a connection 21 and the latter is connected by a wire 22 to the positive pole of a direct current generator or other suitable source of supply 24. Similarly screens or plates 20 are connected together by a connection 25 which is connected by a wire 26 to the negative pole of said source of direct current supply. Entrance plugs 27 are preferably provided in the walls of container 18, said plugs being insulated from said walls and establishing electrical connections between connections 21 and 25 and wires 22 and 26 respectively.

The direct current used in charging the screens is of a volume and intensity sufficient to cause the scale matter contained in the water to be plated on said screens in a manner similar to the electro-plating of metals. As the water in passing through the container is caused to traverse the screens, the scale matter contained in the water is brought in close contact with said metallic screens and is caused by the oppositely charged screens to be electro-deposited on said screens, and thus separated from the water which continues in its travel to the boiler. The screens are of comparatively fine mesh so that the water is finely divided in passing through the screens and a comparatively large amount of metallic electrically charged surface is offered to the water.

In order to insure proper distribution of the water throughout the whole area of the metallic screens and assist in the separation of the scale matter from the water, vessel 18 is filled with suitable filtering material 28 which surrounds all of the screens and helps to keep the latter in proper spaced insulated relation with the adjoining screens. This filtering material is preferably in the form of sand or fine gravel which is a non-conductor of electricity and provides excellent filtering medium for filtering out solids from the water and at the same time allows passage of water therethrough.

In the form shown in Figure 2, boiler 10 is equipped with protective electrical connections 29 which are connected to a suitable source of alternating current for electrically charging the feed water as it is being discharged into said boiler. The feed water pipe 11ª terminates in a T-connection 30 leading from which are short pipe sections 21 which terminate in open-ended enlarged tubular members 32. An electrical distributor 34 is arranged in each member 32 and is insulated therefrom and electrically connected with connections 29. The feed water is discharged into the boiler through members 32 and upon coming in contact with distributors 34 completes the circuit therebetween and is electrically charged with an alternating current which counteracts the thermo-electric current generated by the operating conditions of the boiler. The manner in which this thermo-electric current is generated in the boiler and its effect thereon is more fully set forth in my copending applications Serial No. 70,544, filed November 21, 1925, and Serial No. 103,079, filed April 19, 1926. The alternating current applied to the boiler through connections 29 may be supplied from the main lines 35 and regulated to proper volume and intensity by a transformer T.

In order to provide efficient means for indicating the extent of the deposit of scale matter on the screens, a pressure gauge 36 is placed in each end of the vessel 18. The difference in pressure in the respective gauges indicates the resistance offered to the passage of water through said vessel and as said screens become covered with scale deposits, this resistance increases, thereby causing a greater differential in the pressure of the respective gauges.

In Figure 3 is shown a modified form of my invention wherein the water is treated electrolytically in the vessel 18 by an electric current and the water is then conveyed by a pipe connection 37 to a settling tank 38 where the coagulated matter is allowed to settle and the clear water is discharged from said tank by a pipe connection 39. This settling tank may be used in connection with the filtering medium or without it and the electric current may be either direct current, thereby using the settling tank to precipitate such matter as is not electro-deposited on the screens, or alternating electric current may be used and the coagulated matter not filtered out may be separated from the water in said settling tank.

In the form illustrated in Figure 4, the water is first treated electrolytically by a distributor 40 arranged in the section 41, which latter is interposed in a pipe connection 42. The water is then passed through an electro-magnetic field produced in a pipe section 43 by an electric coil 44. Section 43 which is arranged in pipe connection 42 adjacent to section 41 is preferably made of non-magnetic material so as to induce the magnetic field to pass through the water and thereby act on the matter contained therein. From section 43 the water is discharged into a filter or separator 45 wherein the treated matter is separated from the water and the latter is then conveyed by a pipe 46 to a tank or boiler or other suitable container. A by-pass connection 47 is provided and a series of valves 48 is arranged so that by opening and closing the appropriate valves the separator 45 may be cut out when so desired without interfering with the supply of water to the boiler.

As the water is pumped into boiler 10 or tank 45 it is placed under pressure and this pressure has to be greater than the pressure prevailing in the container in order to force the water thereinto. In the operation of boilers the feed water is heated by being forced into the boiler. Thus the treatment of feed water is done while the water is placed under conditions of temperature and pressure.

The treatment of water exteriorly of the boiler or tank into which said water is discharged permits the removal of the scale matter before the water is released into said boiler or container. This permits the connecting or replacing of the scale removing apparatus without interfering with the operation of the boiler. When the protective electric circuits are used to prevent pitting of the boilers, as shown in Figure 2, such protective circuits may be arranged independently of the scale removing circuits.

While I have shown the preferred forms of my invention, it is obvious that minor changes can be made and substituted, without departing from the spirit of my invention as set forth in the appended claims.

I claim:

1. In an apparatus for extracting chemical salts from boiler feed water, the combination with a boiler, of a closed container, a discharge pipe leading from the discharge end of said container into said boiler, a plurality of metallic screens arranged in said container, said screens being spaced from each other and from said container, a filtering granular material completely filling said container and interposed between said screens for holding them in spaced relation, an electric connection for connecting one set of alternate screens to a positive pole of a source of direct electric current, an electric connection connecting the other set of screens to a negative pole of said source of direct current whereby the chemical salts contained in the water are electrically charged and caused to be electroplated on said screens, and means connected to the inlet end of said container and to said boiler for maintaining the water circulating through said container under increased temperature and pressure.

2. In an apparatus for extracting chemical salts from boiler feed water, the combination with a steam boiler, of a closed container, a pipe connection leading from the outlet end of said container to said boiler, a plurality of metallic screens arranged transversely and removably within said container, said screens being spaced from each other and from said container, a filtering granular material completely filling said container and surrounding said screens for holding the latter in spaced relation, a pair of electric connectors secured to the wall of said container in spaced relation therewith and with each other and adapted to be connected respectively to the positive and negative pole of a source of direct electric current, said connectors extending into said container, an electric connection connecting one connector with one set of alternate screens, a connection connecting the other connector with the other set of said screens whereby the adjacent screens are electrically charged with opposed electrical charges, thereby causing chemical salts contained in the water to be electrically charged and electroplated on said screens, and means for forcing boiler feed water under increased temperature and pressure from said boiler into said container.

In testimony whereof I hereunto affix my signature this 11th day of October, 1926.

GEORGE S. NEELEY.